United States Patent [19]

Sheehan et al.

[11] Patent Number: 4,880,487

[45] Date of Patent: Nov. 14, 1989

[54] HOT MELT ADHESIVES CONTAINING POLY(P-HYDROXYSTYRENE) HOMOPOLYMERS AND COPOLYMERS AND BONDING METHODS EMPLOYING SAME

[75] Inventors: Michael T. Sheehan; Bakulesh N. Shah, both of Corpus Christi, Tex.

[73] Assignee: Hoechst Celanese Corporation, Somerville, N.J.

[21] Appl. No.: 210,897

[22] Filed: Jun. 24, 1988

[51] Int. Cl.$^4$ ................................ C09J 5/00
[52] U.S. Cl. ................................ 156/327; 156/330.9; 156/334; 525/184; 525/229; 525/241; 526/313; 526/329.2; 526/346
[58] Field of Search ............ 156/334, 330.9, 327; 525/184, 241, 229; 526/329.2, 346, 313

[56] References Cited

U.S. PATENT DOCUMENTS

| | | |
|---|---|---|
| 3,448,178 | 6/1969 | Flanagan. |
| 3,449,273 | 6/1969 | Kettering et al. . |
| 3,549,727 | 12/1970 | Coates et al. ................ 156/334 |
| 3,692,878 | 9/1972 | Blance et al. ................ 525/229 |
| 3,886,234 | 5/1975 | Ishihara et al. . |
| 3,929,938 | 12/1975 | White et al. . |
| 3,931,077 | 6/1976 | Uchigaki et al. . |
| 4,127,545 | 11/1978 | Callan et al. . |
| 4,148,775 | 4/1979 | Shima et al. . |
| 4,324,871 | 4/1982 | Acharya et al. . |
| 4,338,414 | 7/1982 | Acharya et al. . |
| 4,412,030 | 10/1983 | Runavot et al. . |
| 4,460,728 | 7/1984 | Schmidt, Jr. et al. . |
| 4,618,640 | 10/1986 | Tsuchida et al. . |

FOREIGN PATENT DOCUMENTS 474542 1/1976 U.S.S.R. ........................ 525/241

*Primary Examiner*—John J. Gallagher
*Attorney, Agent, or Firm*—Herbert M. Hanegan; Donald R. Cassady; Richard S. Roberts

[57] ABSTRACT

A hot melt adhesive composition which is especially useful for bonding polyamide article to surfaces, particularly polyamide surfaces. The composition contains an ethylene-vinyl ester copolymer or a polyamide polymer, and additionally contains a poly(p-hydroxystyrene) homopolymer or a copolymer of poly(p-hydroxystyrene) with a $C_1$ to $C_4$ alkyl acrylate.

35 Claims, No Drawings

HOT MELT ADHESIVES CONTAINING POLY(P-HYDROXYSTYRENE) HOMOPOLYMERS AND COPOLYMERS AND BONDING METHODS EMPLOYING SAME

BACKGROUND OF THE INVENTION

The present invention relates to improved hot melt sealants, or more particularly to hot melt adhesives useful for bonding a variety of materials, especially polyamides. Hot melt adhesives are themoplastic materials useful as sealing and bonding agents. At room temperature, they are non-tacky solids but upon being heated they soften or melt into a liquid or semi-liquid tacky condition. The melted or softened adhesive can then be applied to a surface and permitted to cool. The adhesive adheres to the surface. Such a material can thus be used as a bonding agent to join two surfaces, with the adhesive forming an intermediate layer bound to both.

At room temperature the hot-melt adhesives are generally hard, and a thin film of these adhesives has sufficient tensile strength and elongation so that in many cases it is stronger than the surface being bonded. The adhesives are generally insensitive to pressure once permitted to cool to their solid state. Hot melt adhesives are advantageous due to their low cost, solid nature, quick setting time and ease of handling. As a result of these advantages they have been widely used in the fields of packaging, metal and woodworking. Many types of hot melt adhesives are well known to the skilled artisan. Most commonly, hot melt adhesives comprise a polymer such as ethylenevinyl acetate copolymer (EVA), ethylene-acrylate copolymer and other ethylene copolymers, polyethylene, thermoplastic rubber, polyamide, polyurethane, polyester and similar thermoplastic high-molecular-weight polymers. They frequently also contain a tackifying resin, and a viscosity-controlling agent such as various kinds of waxes. Useful tackifying resins include natural resins such as rosin resin and terpene resin and petroleum resins.

One problem with hot melt adhesives compositions is that they are not universally good adhesives for all materials. For example, some are good bonding agents for paper, glass and wood, but not for metals and plastics. Many adhesives are formulated for their holding properties to specific plastics. This is a function of the type of bond which may be formed by the chemical nature of the adhesive and the materials to be joined. In this regard, many hot melt adhesives are known in the art. U.S. Pat. No. 3,929,938 teaches a mixture of a copolymer of ethylene with a vinyl ester or acrylic ester of a saturated alcohol, and a limonene/phenol condensation product. U.S. Pat. No. 3,991,025 describes a polymerized urethane elastomer, a tackifying resin, a plasticizer, an adhesion promoter and an inert filler. U.S. Pat. 3,931,077 teaches a reactive urethane prepolymer, thermoplastic polymer such as an ethylene-vinyl acetate copolymer and a tackifier. U.S. Pat. No. 3,449,273 teaches a hot melt adhesive which is a mixture of a polymeric fatty acid polyamide and a hydroxyphenolic compound. U.S. Pat. No. 3,408,253 relates to a bonding cement which is an ethylene-propylene-polyene terpolymer rubber. U.S. Pat. No. 3,586,738 claims an adhesive which is heat hardenable and has a chlorine containing elastomer copolymerized with chloroprene. U.S. Pat. No. 3,944,523 discloses poly (phenol/diene) copolymer resins blended with rubbery polymers to produce adhesive compositions having improved tack. U.S. Pat. No. 3,976,606 relates to tackified adhesives containing a terpene-phenolic resin. U.S. Pat. No. 4,032,486 relates to an adhesive tackified with a phenol-diene-olefin resinous reaction product. U.S. Pat. No. 4,127,545 relates to a hot melt sealant comprising a butyl rubber, an ethylene-vinyl acetate copolymer and a phenolic resin. U.S. Pat. No. 4,618,640 teaches a hot melt adhesive comprising an ethylene-vinyl acetate copolymer, a wax and a tackifying resin. U.S. Pat. No. 4,284,541 relates to pressure sensitive hot melt adhesives compound containing a modified ethylene-olefin graft copolymer rubber. U.S. Pat. No. 2,307,885 teaches a lubricating composition containing a vinyl phenol polymer and a vinyl acetate. U.S. Pat. No. 3,448,178 provides a hot melt adhesive containing an ethylene/vinyl acetate copolymer and a phenolic modified terpene resin. U.S. Pat. No. 3,790,647 relates to an ethylene propylene diene rubber with an alkyl substituted phenol acetylene resin. U.S. Pat. No. 2,861,002 provides a hot melt adhesive of a polyvinyl acetate and a plasticizer. U.S. Pat. No. 4,324,871 teaches a hot melt adhesive composition containing an ethylene-vinyl acetate copolymer, an alkenyl succinic anhydride and a tackifying resin. U.S. Pat. No. 4,338,414 discloses an adhesive of an ethylene copolymer, polystyrene resin and alkenyl succinic anhydride. U.S. Pat. No. 4,412,030 shows a hot melt adhesive comprising a styrene/phenolic resin and a modified ethylene vinyl acetate copolymer. U.S. Pat. 3,886,234 provides an adhesive resin composition comprising an ethylene-vinyl acetate copolymer, an unsaturated carboxylic acid, an organic peroxide and an optional phenol. U.S. Pat. No. 4,131,709 provides adhesive compositions with a block copolymer of elastomeric and a non-elastomeric members plus an alkylphenol aldehyde resin. U.S. Pat. No. 4,460,728 relates to a hot melt adhesive containing a copolymer of ethylene and vinyl acetate, atactic polypropylene, tackifying resin, plasticizing oil, petroleum wax and a stabilizer. U.S. Pat. No. 4,148,775 describes a hot melt adhesive of a polyamide copolymer resin and a terpene-phenol resin.

The present invention provides an improved hot melt adhesive composition which includes as a component a homopolymer or copolymer of poly (p-hydroxystyrene). Such adhesives demonstrate improved adhesion to polyamides which is believed to be the result of covalent bonds formed by hydroxyl groups with the polyamide.

SUMMARY OF THE INVENTION

The invention describes a hot melt adhesive composition which comprises:

(a) from about 60% to about 98% based on the weight of the composition of a thermoplastic resin selected from the group consisting of an ethylene-vinyl ester copolymer and a polyamide polymer; and (b) from about 2% to about 40% based on the weight of the composition of a compound selected from the group consisting of poly(p-hydroxystyrene) and copolymers of poly(p-hydroxystyrene) with a $C_1$ to $C_4$ alkyl acrylate.

The invention also provides a method for adhering a polyamide article to a surface, particularly to other polyamide surfaces which comprising heating the above composition to a temperature of at least its softening temperature but below its decomposition temperature and preferably in the range of from about 70° C. to about 200° C. and disposing the heated composition between said article and said surface; and contacting said article and said surface together with said composition therebetween; and thereafter cooling said composition.

DETAILED DESCRIPTION OF THE PREFERRED EMBODIMENT

As hereinbefore mentioned, the invention provides a hot melt adhesive composition which is especially useful for bonding polyamide articles to surfaces, particularly other polyamide surfaces. The composition contains an ethylene-vinyl ester copolymer or a polyamide polymer, and additionally contains a poly(p-hydroxystyrene) homopolymer or a copolymer of poly(p-hydroxystyrene) with a $C_1$ to $C_4$ alkyl acrylate.

The ethylene/vinyl ester compounds useful for this invention are well known to the art and have been prepared by many commercial methods.

Ethylene/vinyl acetate copolymers have been prepared by copolymerizing a mixture of ethylene and vinyl acetate in the presence of a catalyst, such as oxygen or an organic peroxide, such as dibutylhydroperoxide, in a tubular reactor under gauge pressures ranging from 15,000 lbs. per square inch to 30,000 lbs. per square inch and at temperatures ranging from about 300° F. to about 480° F. The copolymer is then separated from the residual monomer and other by-products. By varying the conditions of pressure, temperature, catalyst concentration and proportion of vinyl acetate and ethylene, one can obtain copolymers of varying molar proportions of ethylene to vinyl acetate, having different inherent viscosities and thus molecular weights. These are more fully described in U.S. Pat. Nos. 3,448,178 and 3,929,938 which are incorporated herein by reference.

The ethylene/vinyl ester copolymers (e.g. ethylene/vinyl acetate) are tough, rubbery, generally non-crystalline materials having a molecular weight of the order of from about 200,000 to about 500,000 or more preferably from about 250,000 to about 400,000, and most preferably from about 275,000 to about 350,000; and an inherent viscosity, measured at 86° F., in a 0.25% solution of the copolymer in toluene of 0.45 to 1.5. The copolymers of ethylene and vinyl ester, e.g. vinyl acetate, can contain from about 4 to about 16 mols ethylene per mol of vinyl acetate, or other vinyl ester. These copolymers preferably contain from about 4 to about 6 mols ethylene per mol vinyl acetate and have inherent viscosity of from about 0.6 to about 1.2, and preferred Melt Index of from about 38 to about 48.

Polyamides which are useful as hot melt adhesives are also well known in the art as described in U.S. Pat. Nos. 3,449,273 and 4,148,775 which are incorporated herein by reference.

Polyamides, for the purposes of this invention, include polymeric fatty acid amides and polyamide containing copolymers. Examples of the polymeric fatty acid polyamides suitable for this invention are commercially available products preferably having a softening point of about 80° C. to 200° C. These are well known and are prepared in the conventional manner using conventional amidification techniques. In general, this amidification is preferably conducted at temperatures of between 180° C. to 280° C. by condensing polymeric fatty acids, or mixtures thereof, with other dicarboxylic acids, with ethylene diamine or mixture of ethylene diamine with other amine reactants, primarily other diamines. Useful polyamides copolymer resins having a melting point of from about 80° to about 160° C. and prepared from three monomers are disclosed in U.S. Pat. No. 4,148,775. Examples of such resins are those prepared from nylon 6,6 salt, nylon 6,9 salt, nylon 6,10 salt, nylon 6,12 salt, etc. Preferred polyamides copolymer resins are those prepared from three or four monomers. Examples of such preferably resins are nylon 6/6,6/12, nylon 6/6,10/12, nylon 6/6,12/12, nylon 6/6,9/12, nylon 6/6,6/6,10,12,6/6,6/11/12, etc.

The poly(p-hydroxystyrene) or polyvinyl phenol homopolymers of this invention may be prepared by methods which are well known to the skilled artisan. Such include the free radical polymerization of vinyl phenol, or polymerization of p-acetoxystyrene and hydrolysis of poly(p-acetoxystyrene) to poly(p-hydroxystyrene). Vinyl phenol may be prepared by a five step process of (1) acetylating phenol to p-hydroxyacetophenone, (2) acetylation of p-hydroxyacetophenone to p-acetoxyacetophenone, (3) hydrogenation to p-acetoxyphenylmethylcarbinol, (4) dehydration to p-acetoxystyrene, and (5) saponification to p-vinylphenol. The method is more fully described in Corson, B. B., et al, *Preparation of Vinylphenols and Isopropenylphenols.* April 1958. Another method is taught in U. S. Pat. 4,451,676, both of which are incorporated herein by reference.

The poly (p-hydroxystyrene-co-$C_1$ to $C_4$ alkyl acrylates) of this invention may be prepared by methods which are also well known in the art such as by the free radical bulk, solution, suspension or emulsion copolymerization of p-hydroxystyrene and the monomeric $C_1$ to $C_4$ alkyl acrylate, or polymerization of a p-acetoxystyrene/$C_1$ to $C_4$ alkyl acrylate mixture followed by hydrolysis of the poly(p-acetoxystyrene) copolymer to the poly(p-hydroxystyrene) copolymer. Suitable free radical polymerization catalysts are well known in the art and non-exclusively include peroxides such as benzoyl peroxide. The preparation of such copolymers is more fully described in U. S. Pat. 2,276,138 which is incorporated herein by reference. In the preferred embodiment, the p-hydroxystyrene and $C_1$ and $C_4$ alkyl acrylate appear in the copolymer in a respective mol ratio of monomers of from about 0.1:99.9 to about 30:70, or more preferably from about 0.5:99.5 to about 20:80 and most preferably from about 2:98 to about 10:90.

In another embodiment of the invention these poly(p-hydroxystyrene) copolymers may be used as hot melt adhesives in and of themselves, i.e., without the ethylene vinyl acetate or polyamide.

When the poly(p-hydroxystyrene) copolymer is itself the hot melt adhesive it is present in an amount of from about 80% to about 100% of the composition. The balance, if any, comprises one or more of the hereinafter set forth additives or other additives known in the art.

In the preferred embodiment, the poly(p-hydroxystyrene) co-polymer has a molecular weight ranging from about 5,000 to about 500,000, or more preferably from about 30,000 to about 250,000 and most preferably from about 75,000 to about 125,000. The hot melt adhesive compositions of this invention may be prepared by merely melting the substituents and blending them until a substantially uniform admixture is obtained. It may then be cooled and molded or extruded into any desired shape. In the preferred embodiment, the ethylene-vinyl acetate or polyamide component is present in the hot melt adhesive composition in an amount of from about 60% to about 98%, more preferably from about 70% to about 90% and most preferably from about 75% to about 85% based on the weight of the overall composition.

In the preferred embodiment, the poly(p-hydroxystyrene) homopolymer or copolymer component is present in the hot melt adhesive composition in an amount of from about 2% to about 40%, more preferably from about 5% to about 25% and most preferably from about 15% to about 20% based on the weight of the overall composition.

The composition may optionally contain minor amounts, and usually about 20% or less, of other art recognized additives for the modification of the composition properties. Such non-exclusively include tackifiers, diluents, plasticizers, fillers, hardeners, oils, waxes, viscosity modifiers, rosin, colorants, extenders, rubbers and the like, as are well known in the art of producing hot melt adhesives.

Once the hot melt composition is constituted, it may be used by merely heating it to its softening temperature and coating it between an article and a surface to be adhered, with subsequent cooling. Heating may take place in commercially available hot melt glue guns or another suitable apparatus. Preferred softening temperatures range from about 70° C. to about 200° C. A more preferred temperature is from about 75° C. to about 160° C. and most preferably from about 80° C. to about 150° C. The temperature is not critical as long as it is below the decomposition temperature of the composition, and may be adapted by the skilled artisan by varying the melt components.

Coating of the substrate can be accomplished by the usual processing methods, such as, for example, casting, knife-coating, or spraying from the melt and then immediately pressing on the upper part that is to be bonded, or it can be done in two working steps by additional heat sealing of the joint areas under pressure. In the latter case, hot melt adhesive of the invention can also be placed in the form of strand or film between the two parts which are to be bonded. While not preferred because of the time involved, the adhesives can be applied from solution, if desired, in which case the solvents are evaporated before the heat sealing.

The following non-limiting examples serve to illustrate the invention:

EXAMPLE #1

A 50/50 mole ratio copolymer of poly(p-hydroxystyrene) (PHS) and styrene, 5,000 Mw, is melt blended at 160° C. into an ethylene/vinyl acetate copolymer (EVA) (67/33) mole ratio. The resulting mixture is 10 parts PHS/Styrene copolymer by weight, EVA 90 parts by weight. The softening point of the mixture is about 105° C.

This mixture is heated to 176° C. and laminated between aluminum sections. One half inch strips are cut. Peel strengths are measured after 7 days. Four samples give peel strengths of: 1800, 1400, 1800 and 2000 grams. EVA by itself gives peel strengths of 1400, 1100, 1100 and 1000 grams.

EXAMPLE #2

A 5/95 mole ratio copolymer of poly(p-hydroxystyrene)/methyl acrylate, (PHS/MA) 100,000 Mw is produced. This is used as a complete hot melt adhesive. It is compared to methyl acrylate homopolymer in adhesion to nylon 6,6. Two 1-mil nylon strips are laminated together at 177° C. with the above PHS/MA copolymer. The adhesive bond is too strong for the nylon film and the film breaks in the peel testing apparatus. The films are peel tested after 3 days ageing at room temperature.

Two 3-mil Nylon 6,6 films are laminated together at 177° C. with the PHS/MA copolymer. The adhesive bond is again very strong and the nylon film breaks at 4100–4540 grams/in. peel strength. The film is peel tested after 3 days aging at room temperature. By comparison, polymethylacrylate is laminated between two 1-mil nylon strips at 177° C. and the measured peel strength is 350–600 grams/in.

EXAMPLE #3

Samples of polyester (PET) film with and without polyhydroxystyrene (PHS) on the surface (solvent impregnated), are press molded to Nylon 6 film at 232° C. for 10 minutes. PHS 5,000 Mw is used.

The following procedure is used to solvent impregnate the film. The PET film is immersed in an impregnating solution of acetone/water/PHS, 94/5/1 by weight percent. The solution is heated to 70° C. for 1 hour. The film is washed and wiped to remove PHS that is not impregnated.

The PHS containing PET film is press molded to nylon 6 as earlier described and peel strength is determined to be greater than 1200 grams/inch. The straight PET film is press molded to nylon 6 in the same manor and the peel strength is determined to be 150–250.

What is claimed is:

1. A hot melt adhesive composition which comprises in admixture
   (a) from about 60% to about 98% based on the weight of the composition of a thermoplastic resin selected from the group consisting of an ethylene-vinyl ester copolymer and a polyamide polymer; and
   (b) from about 2% to about 40% based on the weight of the composition of a compound selected from the group consisting of poly(p-hydroxystyrene) and copolymers of poly(p-hydroxystyrene) with a $C_1$ to $C_4$ alkyl acrylate.

2. The composition of claim 1 wherein resin (a) has a molecular weight of from about 200,000 to about 500,000.

3. The composition of claim 1 wherein compound (b) has a molecular weight of from about 5,000 to about 500,000.

4. The composition of claim 1 wherein compound (b) is a poly(p-hydroxystyrene) homopolymer.

5. The composition of claim 1 wherein compound (b) is a copolymer of poly(p-hydroxystyrene) and a $C_1$ to $C_4$ alkyl acrylate in a respective mol ratio of from about 0.1:99.9 to about 30:70.

6. The composition of claim 5 wherein said acrylate is n-butyl acrylate.

7. The composition of claim 1 wherein resin (a) comprises an ethylene-vinyl acetate copolymer in a respective mol ratio of from about 4:1 to about 16:1.

8. The composition of claim 1 wherein resin (a) is an ethylene-vinyl acetate copolymer and compound (b) is a compound selected from the group consisting of a poly(p-hydroxystyrene) homopolymer and copolymers of poly(p-hydroxystyrene) with methyl, ethyl or n-butyl acrylate.

9. The composition of claim 1 wherein resin (a) has a molecular weight of from about 250,000 to about 400,000 and is present in the composition in an amount of from about 70% to about 90% based on the weight of the composition and wherein compound (b) has a molecular weight of from about 30,000 to about 250,000 and is present in the composition in an amount of from about 5% to about 25% based on the weight of the composition.

10. The composition of claim 8 wherein resin (a) has a molecular weight of from about 275,000 to about 350,000 and is present in the composition in an amount of from about 75% to about 85% based on the weight of the composition and wherein compound (b) has a molecular weight of from about 75,000 to about 125,000 and is present in the composition in an amount of from about 15% to about 20% based on the weight of the composition.

11. The composition of claim 1 further comprising minor amounts of one or more components selected from the group consisting of tackifiers, diluents, plasticizers, fillers, hardeners, oils, waxes, viscosity modifiers, rosin, colorants, extenders and rubbers.

12. A method of adhering a polyamide article to a surface which comprises providing a hot melt adhesive composition which comprises.
  (a) from about 60% to about 98% based on the weight of the composition of a thermoplastic resin selected from the group consisting of an ethylene-vinyl ester copolymer and a polyamide polymer; and
  (b) from about 2% to about 40% based on the weight of the composition of a compound selected from the group consisting of poly(p-hydroxystyrene) and copolymers of poly(p-hydroxystyrene) with a $C_1$ to $C_4$ alkyl acrylate; heating said composition to a temperature of at least its softening temperature but below its decomposition temperature; and disposing the heated composition between said article and said surface; contacting said article and said surface together with said composition therebetween; and thereafter cooling said composition.

13. The method of claim 12 wherein resin (a) has a molecular weight of from about 200,000 to about 500,000.

14. The method of claim 12 wherein compound (b) has a molecular weight of from about 5,000 to about 500,000.

15. The method of claim 12 wherein compound (b) is a poly(p-hydroxystyrene) homopolymer.

16. The method of claim 12 wherein compound (b) is a copolymer of poly(p-hydroxystyrene) and a $C_1$ to $C_4$ alkyl acrylate in a respective mol ratio of from about 0.1:99.9 to about 10:95.

17. The method of claim 16 wherein said acrylate is n-butyl acrylate.

18. The method of claim 12 wherein resin (a) comprises an ethylene-vinyl acetate copolymer in a respective mol ratio of from about 4:1 to about 16:1.

19. The method of claim 12 wherein resin (a) comprises an ethylene-vinyl acetate copolymer and compound (b) is a compound selected from the group consisting of a poly(p-hydroxystyrene) homopolymer and copolymers of poly(p-hydroxystyrene) with methyl, ethyl or n-butyl acrylate.

20. The method of claim 12 wherein resin (a) has a molecular weight of from about 250,000 to about 400,000 and is present in the composition in an amount of from about 70% to about 90% based on the weight of the composition and wherein compound (b) has a molecular weight of from about 30,000 to about 250,000 and is present in the composition in an amount of from about 5% to about 25% based on the weight of the composition.

21. The method of claim 19 wherein resin (a) has a molecular weight of from about 275,000 to about 350,000 and is present in the composition in an amount of from about 75% to about 85% based on the weight of the composition and wherein compound (b) has a molecular weight of from about 75,000 to about 125,000 and is present in the composition in an amount of from about 15% to about 20% based on the weight of the composition.

22. The method of claim 12 wherein said surface comprises polyamide.

23. The method of claim 12 wherein said surface comprises polyester.

24. The method of claim 12 wherein said composition further comprises minor amounts of one or more components selected from the group consisting of tackifiers, diluents, plasticizers, fillers, hardeners, oils, waxes, viscosity modifiers, rosin, colorants, extenders and rubbers.

25. A method of adhering an article to a surface which comprises providing a hot melt adhesive composition which comprises at least a major amount, based on the weight of the composition of a compound selected from the group consisting of poly(p-hydroxystyrene) and copolymers of poly(p-hydroxystyrene) with a $C_1$ to $C_4$ alkyl acrylate; heating said composition to a temperature of at least its softening temperature but below its decomposition temperature; disposing the heated composition between said article and said surface; contacting said article and said surface together with said composition therebetween; and thereafter cooling said composition.

26. The method of claim 25 wherein said compound has a molecular weight of from about 5,000 to about 500,000.

27. The method of claim 25 wherein said compound is a poly(p-hydroxystyrene) homopolymer.

28. The method of claim 25 wherein said compound is a copolymer of poly(p-hydroxystyrene) and a $C_1$ to $C_4$ alkyl acrylate in a respective mol ratio of from about 0.1:99.9 to about 10:95.

29. The method of claim 25 wherein said acrylate is n-butyl acrylate.

30. The method of claim 25 wherein said compound is selected from the group consisting of a poly(p-hydroxystyrene) homopolymer and copolymers of poly(p-hydroxystyrene) with methyl, ethyl or n-butyl acrylate.

31. The method of claim 25 wherein said compound has a molecular weight of from about 30,000 to about 250,000 and is present in the composition in an amount of from about 80% to abut 100% based on the weight of the composition.

32. The method of claim 25 wherein said compound has a molecular weight of from about 75,000 to about 125,000 and is present in the composition in an amount of from about 90% to about 100% based on the weight of the composition.

33. The method of claim 25 wherein said surface comprises polyamide or polyester.

34. The method of claim 25 wherein said article comprises polyamide.

35. The method of claim 25 wherein said composition further comprises minor amounts of one or more components selected from the group consisting of tackifiers, diluents, plasticizers, fillers, hardeners, oils, waxes, viscosity modifiers, rosin, colorants, extenders and rubbers.

* * * * *